United States Patent
Watanabe et al.

(10) Patent No.: US 7,125,232 B2
(45) Date of Patent: Oct. 24, 2006

(54) CONTROLLER OF INJECTION MOLDING MACHINE

(75) Inventors: Hiroshi Watanabe, Fujiyoshida (JP); Tatsuhiro Uchiyama, Gotenba (JP); Wataru Shiraishi, Yamanashi (JP); Satoshi Takatsugi, Yamanashi (JP)

(73) Assignee: Fanuc LTD, Yamanashi (JP)

( * ) Notice: Subject to any disclaimer, the term of this patent is extended or adjusted under 35 U.S.C. 154(b) by 296 days.

(21) Appl. No.: 10/697,869

(22) Filed: Oct. 31, 2003

(65) Prior Publication Data

US 2004/0091567 A1  May 13, 2004

(30) Foreign Application Priority Data

Nov. 5, 2002 (JP) .............................. 2002-321441

(51) Int. Cl.
 *B29C 45/77* (2006.01)
(52) U.S. Cl. ...................................... 425/145; 425/149
(58) Field of Classification Search ................ 425/145, 425/149
See application file for complete search history.

(56) References Cited

U.S. PATENT DOCUMENTS

| | | | |
|---|---|---|---|
| 5,371,450 A | 12/1994 | Hiraoka | |
| 5,567,367 A * | 10/1996 | Ito et al. ....................... | 425/145 |
| 6,755,636 B1 * | 6/2004 | Nishio ......................... | 425/145 |
| 6,814,558 B1 * | 11/2004 | Kubota et al. .............. | 425/149 |
| 2002/0008329 A1 | 1/2002 | Shiori et al. | |

FOREIGN PATENT DOCUMENTS

| | | |
|---|---|---|
| CN | 85 1 05528 | 12/1986 |
| EP | 0 968 808 A2 | 1/2000 |
| JP | 45-2988 | 1/1970 |
| JP | 61-010425 | 1/1986 |
| JP | 61-058713 | 3/1986 |
| JP | 10-016016 | 1/1998 |
| JP | 11-129296 | 5/1999 |

OTHER PUBLICATIONS

Chinese Office Action of Application No. 200310103275 dated Oct. 28, 2005.
European Search Report issued Mar. 20, 2003, Reference No. P100478EP00 (3 pages).
Patent Abstracts of Japan for Publication No. 63303716 dated Dec. 12, 1988.

* cited by examiner

*Primary Examiner*—Tim Heitbrink
(74) *Attorney, Agent, or Firm*—Staas & Halsey LLP (57) ABSTRACT

A screw is rotated at a set speed and retreated by performing back pressure control for keeping a resin pressure at a set pressure. When the retreat position of the screw reaches a change point set nearby a set metering completion position, the back pressure control for keeping the resin pressure at a set resin pressure is stopped. A command for positioning the screw at a metering completion position is output to position the screw at the metering completion position. At the same time, when a screw position reaches the change point, the screw is reversed by a set value at a set speed.

17 Claims, 12 Drawing Sheets

CONTROLLER OF INJECTION MOLDING MACHINE

BACKGROUND OF THE INVENTION

1. Field of the Invention

The present invention relates to a controller of an injection molding machine.

2. Description of the Related Art

In a metering step of an injection molding machine, metering is performed by changing the retreat speed of a screw so that a set back pressure is obtained while rotating the screw at a set rotational speed, and the retreat speed of the screw is decreased so that the screw stops at a set metering completion position immediately before the set metering completion position to stop the screw at the set metering completion position. When decreasing the screw retreat speed but not changing the rotational speed of the screw, a resin pressure (back pressure) may rise. When the resin pressure rises, melted resin densities are changed, a fluctuation occurs, and the weight of a molded product fluctuates.

Therefore, a metering control method is publicly known (for example, refer to Japanese Patent Application Laid-Open No. 11-129296) in which the fluctuation of the density of a melted resin is decreased by performing feedback control of a resin pressure even at the end of a metering step in a state or close to a state of stop of screw rotation and stopping the pressure feedback control when retreat of a screw stops or approaches to a stop state of the retreat.

Moreover, a method for uniforming metering by preparing a plurality of combinations of back pressure commands and screw rotational speed commands, controlling back pressures and screw rotational speeds in association with each other base on the combinations, and controlling a screw rotational speed and a screw retreat speed so as to decrease them to zero is also known (for example, refer to Japanese Examined Patent Publication No. 1-26857).

Moreover, a method for obtaining a stable metered resin amount by sequentially decreasing a screw rotational speed before stop of metering on the basis of a screw retreat position is also known (for example, refer to Japanese Examined Patent Publication No. 64-6931).

Furthermore, a method for setting a pressure state in which a check valve is easily closed during injection by causing the screw to retreat without rotating the screw (that is, performing sack back) after metering is completed, lowering the pressure of a melted resin at the front end of a cylinder, and thereby preventing the melted resin from trailing down from a nozzle (drooling phenomenon) is generally used. Furthermore, a method for improving the sealing at the time of injection by reversing a screw after metering is completed and closing a check valve is also known (for example, refer to Japanese Patent No. 3118188 and Japanese Examined Patent Publication No. 45-2988).

In the case of the above-described conventional metering methods, an excessive long time is required in the deceleration section of a screw retreat speed nearby a metering completion position and thereby a metering time tends to be lengthened. Moreover, each of the conventional methods is a method for stabilizing a resin state in metering steps up to completion of metering.

As a method for stabilizing a resin state after completion of metering, the above sack back operation or a method for improving the sealing at the time of injection by reversing a screw after completion of metering and closing a check valve is a stabilization processing after completion of metering, which is performed between a metering step and an injection step. Thus, there is a disadvantage that a molding cycle is lengthened by the time required for performing such processing.

SUMMARY OF THE INVENTION

The present invention relates to a controller of an injection molding machine for controlling a back pressure while rotating a screw at a set rotational speed and retreating the screw or plunger up to a set metering completion position.

A first aspect of a controller of the present invention comprises means for advancing or retreating a screw or plunger, means for rotating the screw, means for detecting the position of the screw or plunger, means for detecting a resin pressure, back pressure feedback control means for controlling the means for advancing or retreating the screw or plunger so that a detected resin pressure coincides with a set resin pressure, means for stopping the back pressure feedback control by the back pressure feedback control means when the screw or plunger reaches a set change point before the screw or plunger reaches a metering completion position and moving the screw or plunger up to the metering completion position, and means for reversing the screw when the screw or plunger reaches the set change point.

In the above controller, the set change point may be determined by a preset position of the screw or plunger.

Time measuring means for measuring an elapsed time since start of metering may be provided so that the set change point is determined by the timing at which the time measuring means measures a preset time.

Moreover, means for detecting a screw rotating torque may be provided so that the set change point is determined by the timing when a screw rotating torque reaches a preset value.

A second aspect of the controller of the present invention comprises means for advancing or retreating a screw or plunger, means for rotating the screw, means for detecting the position of the screw or plunger, means for detecting a resin pressure, back pressure feedback control means for controlling the means for advancing or retreating the screw or plunger so that a detected resin pressure coincides with a set resin pressure, means for stopping the back pressure feedback control by the back pressure feedback control means when the screw or plunger reaches a set change point before the screw or plunger reaches a metering completion position and moving the screw or plunger up to the metering completion position, and means for reversing the screw when a screw or plunger retreat speed preset by the means for detecting the retreat speed of the screw or plunger is detected.

A third aspect of the controller of the present invention comprises means for advancing or retreating a screw or plunger, means for rotating the screw, means for detecting the position of the screw or plunger, means for detecting a resin pressure, back pressure feedback control means for controlling the means for advancing or retreating the screw or plunger so that a detected resin pressure coincides with a set resin pressure, means for stopping the back pressure feedback control by the back pressure feedback control means when the screw or plunger reaches a set change point before the screw or plunger reaches a metering completion position and moving the screw or plunger up to the metering completion position, and means for reversing the screw when a resin pressure exceeding a preset resin pressure is detected by resin pressure detection means.

A controller of the present invention can have the following modes.

The means for reversing a screw may reverse the screw by a set rotational value at a preset rotational speed.

The means for reversing a screw may reverse the screw at multistage by changing the present rotation speed to each set rotational speed in accordance with a rotation amount of the screw.

The means for reversing a screw may reverse the screw for a set predetermined time at a preset rotational speed.

The means for reversing a screw may reverse the screw at multistage by changing the present rotational speed to each set rotational speed in accordance with the elapsed time since start of metering.

The means for reversing a screw may reverse the screw for a set predetermined time at a preset torque.

The means for reversing a screw may reverse the screw at multistage by changing the present torque to each set torque in accordance with the elapsed time since start of metering.

The means for reversing a screw may reverse the screw by a set rotation amount at a preset torque.

The means for reversing a screw may reverse the screw at multistage by changing the present torque to each set torque in accordance with a rotation amount of the screw.

The back pressure feedback control means may command a retreat value of the screw or plunger so that a detected resin pressure coincides with a set resin pressure.

The back pressure feedback control means may command the retreat speed of the screw or plunger so that a detected resin pressure coincides with a set resin pressure.

The back pressure feedback control means may command a torque for retreating a screw or plunger so that a detected resin pressure coincides with a set resin pressure.

The present invention provides a controller capable of stabilizing a metering operation in a metering step and stabilizing a resin state after metering, thereby shortening a molding cycle.

BRIEF DESCRIPTION OF THE DRAWINGS

The above and other objects and features of the present invention will become more apparent from the following description of embodiments by referring to accompanying drawings, in which.

DESCRIPTION OF THE EMBODIMENTS

Figure 1:
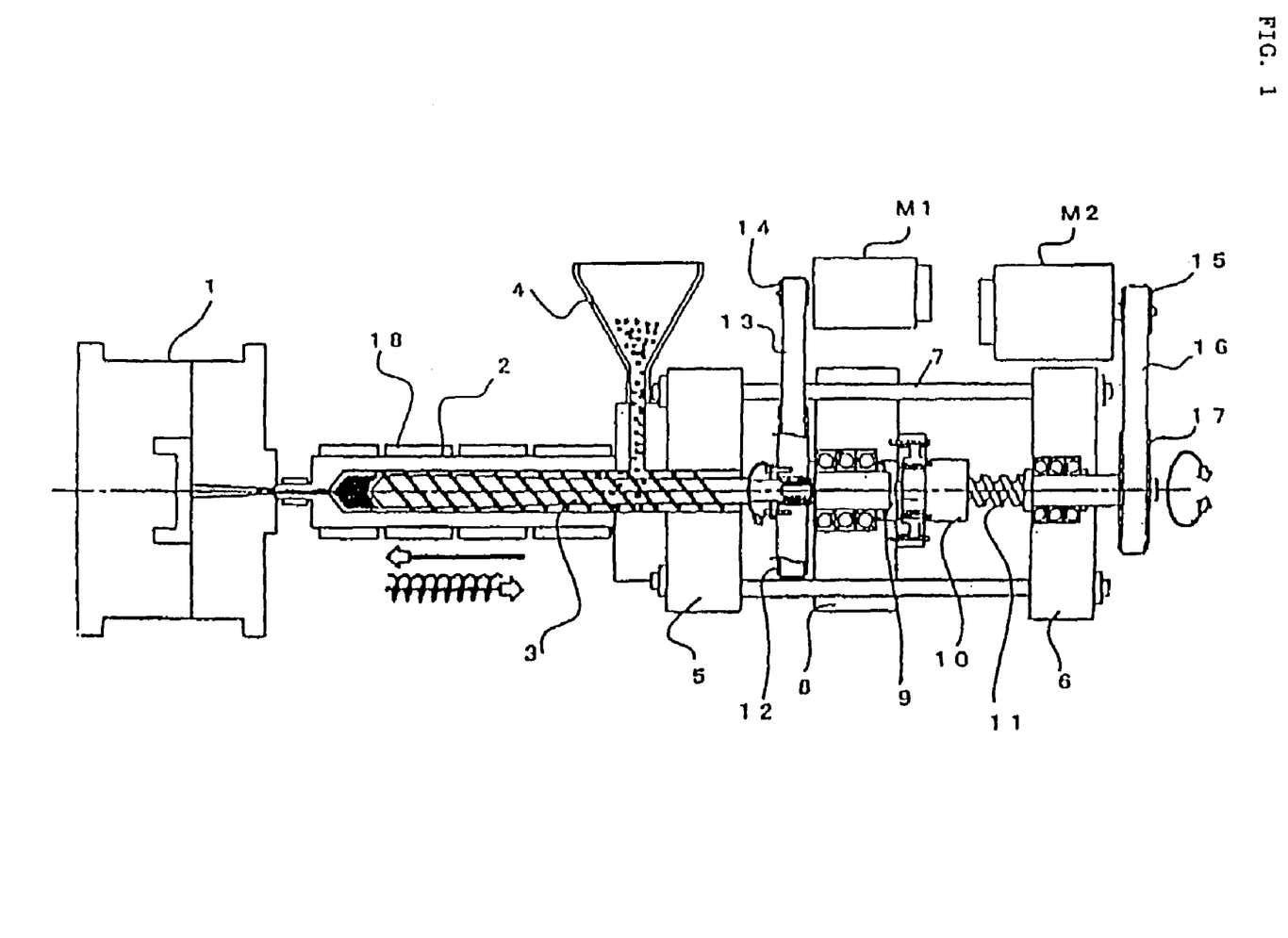
FIG. 1 is a schematic view of an injection mechanism of an injection molding machine to which each embodiment of a metering method of the present invention is applied.

FIG. 1 is a schematic diagram of the injection mechanism part of one example of an injection molding machine to which the control device of the present invention is applied. In this figure, 1 indicates a metal mold, 2 indicates a cylinder, 3 indicates a screw, 4 indicates a hopper which supplies resin pellets to the interior of the cylinder, 5 indicates a front plate that forms the injection mechanism, and 6 indicates a rear plate. Furthermore, a plurality of guide bars 7 are disposed between the abovementioned front plate 5 and rear plate 6, and a pusher plate 8 is disposed so that this plate can freely move in the forward-rearward direction (left-right direction in the figure) while being guided by these guide bars 7.

The base part of the screw 3 is attached to the abovementioned pusher plate 8 so that the screw 3 is free to rotate, and a driven pulley 12 is attached to this base part. The screw 3 is rotationally driven by a screw rotating servo motor M1 via a driving pulley 14, timing belt 13 and the abovementioned driven pulley 12. Furthermore, the screw rotating servo motor M1 is omitted from the figure; however, this motor is attached to the pusher plate 8 and advances and retracts together with the pusher plate 8.

Furthermore, a ball nut 10 is attached to the pusher plate 8 via a pressure sensor (load cell) 9 for detecting the pressure of molten resin; a ball screw 11 is screw-engaged with this ball nut 10, and this ball screw 11 is rotationally driven by a screw advancing and retracting servo motor M2 via a driving pulley 15, timing belt 16 and driven pulley 17. As a result, the screw 3 is driven in the axial direction (left-right direction in the figure) via the pusher plate 8.

Figure 2:
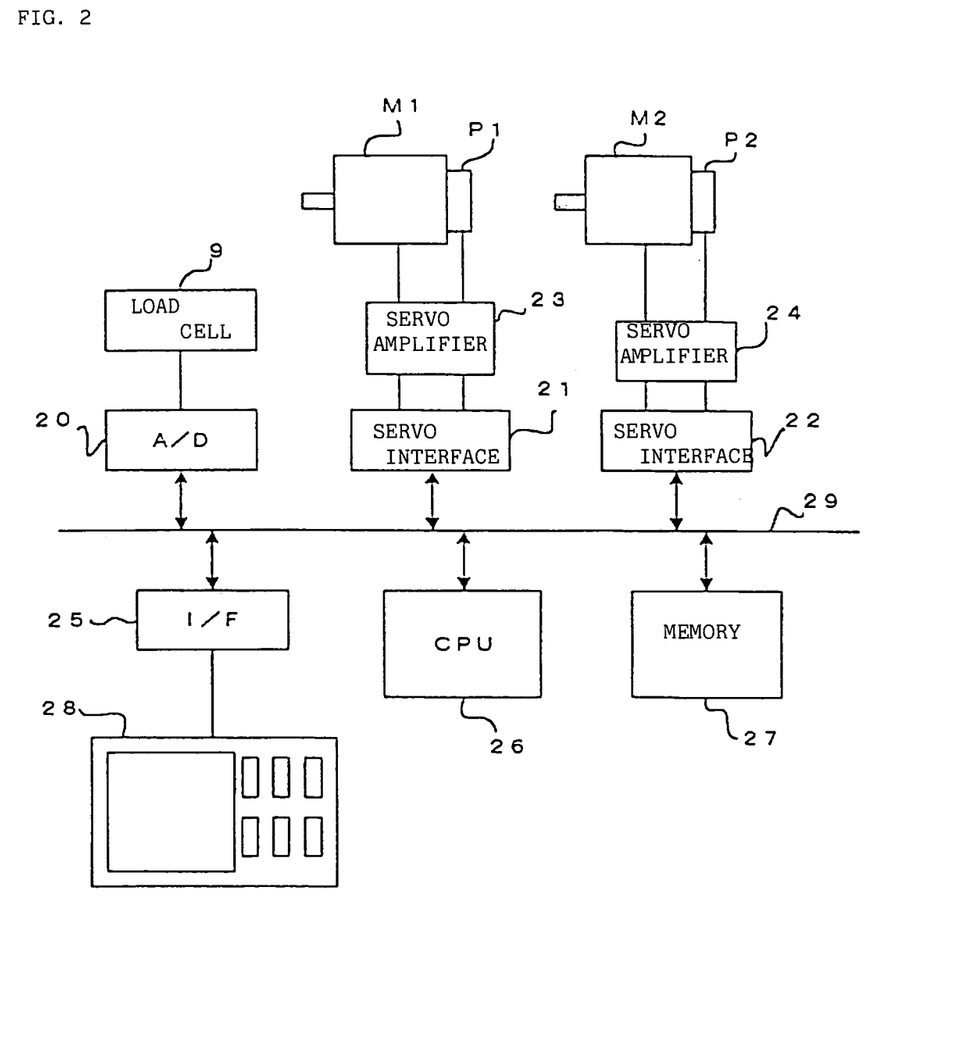
FIG. 2 is a block diagram of essential portions of an embodiment constituting a controller of the present invention which is a controller for controlling the injection molding machine in FIG. 1.

FIG. 2 is a block diagram of the essential parts of the control device that controls this injection molding machine; the control device of the present invention is constructed from this control device shown in FIG. 4.

In FIG. 2, the symbol 26 indicates a processor which controls this injection molding machine as a whole; an A/D converter 20 which converts analog signals into digital signals, servo interfaces 21 and 22, an input-output interface 25, and a memory 27 constructed from a ROM, RAM, nonvolatile RAM or the like are connected to this processor via a bus 29. The pressure sensor (load cell) 9 is connected to the A/D converter 20, and servo amplifiers 23 and 24 are respectively connected to the servo interfaces 21 and 22.

The servo motor M1 and a position/speed detector P1 are connected to the servo amplifier 23. The position and rotational speed of the servo motor M1 are detected by the abovementioned position/speed detector P1, so that the amount of rotation and rotational speed of the screw 3 are detected. The servo amplifier 23 receives movement commands issued by the processor 26 during metering via the servo-interface 21, and controls the driving of the servo motor M1 by performing feedback control of the speed, and also performing feedback control of the current (torque), in accordance with the actual speed of the servo motor M1

(rotational speed of the screw) that is detected by the position/speed detector P1 and fed back. The present invention is characterized in that control of a rotation amount (or control of position) is performed with a movement command, issued from the processor 26, which has a predetermined rotation amount with the direction reversed with respect to the direction during metering.

Furthermore, the servo motor M2 and a position/speed detector P2 such as an encoder or the like are connected to the servo amplifier 24. The rotational position and rotational speed of the servo motor M2 are detected by this position/speed detector P2, so that the advancing/retraction position and advancing/retraction speed of the screw 3 are detected. The servo amplifier 24 receives position commands or speed commands output by the processor 26 via the servo interface 22, and controls the driving of the servo motor M2 by performing feedback control of the position and/or speed, and also performing feedback control of the current (torque), in accordance with the rotational position and/or actual speed of the servo motor M2 (speed to the screw) that is detected and fed back by the position/speed detector P2. Furthermore, the servo amplifiers 23 and 24 may be constructed from hardware alone such as electrical circuits or the like; in the present embodiment, however, these servo amplifiers are constructed from so-called digital servo amplifiers which are formed by a processor, ROM, RAM or the like, and which control the position, speed, torque and the like of the servo motors by means of software.

A data input-output device 28 comprising display means constructed from a liquid crystal display or CRT is connected to the input-output interface 25, and the setting of various commands, various parameters and the like can be performed by this input-output device 28, so that various set values, the screw rpm, the screw retraction position and the like (described later) can be displayed by the display means.

The abovementioned construction is the same as the construction in a conventional injection molding machine control device; however, this control device differs from a conventional injection molding machine control device in that the device comprises functional means for controlling the resin pressure in the metering process, and performing control so that the retraction of the screw and the rotation of the screw both stop when metering is completed.

Figure 3:
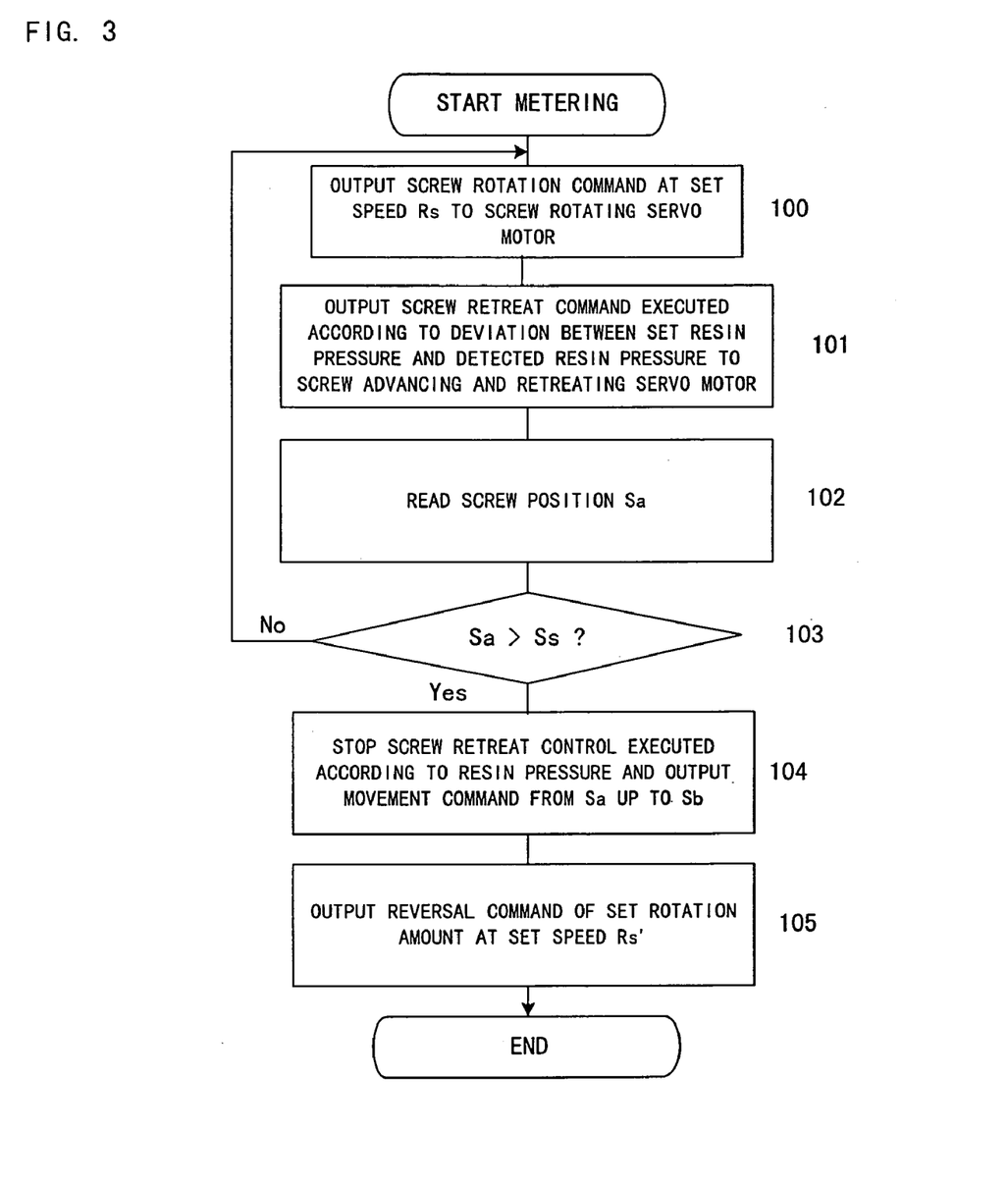
FIG. 3 is a flowchart of operations in a metering step of a first embodiment of the present invention.
Figure 4A:
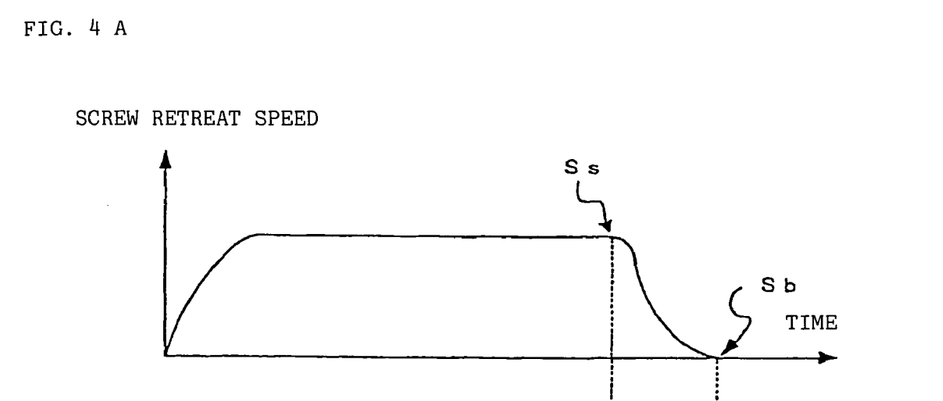
FIGS. 4A and 4B are illustrations for explaining states of a screw retreat speed and screw rotational speed in the metering step of the first embodiment.
Figure 4B:
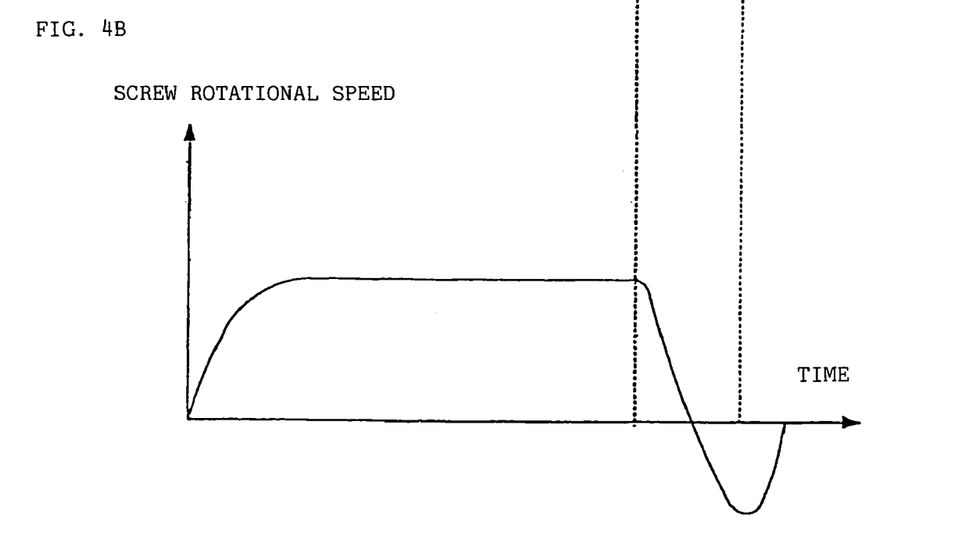

FIG. 3 is a flowchart of operations in the metering step of the first embodiment to be executed by a processor 26 of the present controller. Moreover, FIGS. 4A and 4B are illustrations for explaining states of the screw retreat speed and screw rotational speed in the metering step of the embodiment.

When the metering step is started, the processor 26 first outputs a screw rotational speed command at a set rotational speed Rs to a servo amplifier 23 through a servo interface 21 (step 100). The servo amplifier 23 performs speed loop control in accordance with the rotational speed command and speed information fed back from a position/speed detector P1 to rotate a screw 3 at a set speed as shown in FIG. 4B.

Moreover, the processor 26 reads a resin pressure detected by a pressure sensor (load cell) 9 through an A/D converter 20 and outputs a screw retreat command in accordance with the deviation between a set resin pressure and a detected resin pressure to perform the back pressure feedback control (step 101). The screw retreat command is output to a servo amplifier 24 through a servo interface 22 and the servo amplifier 24 receives the screw retreat command to perform position and speed loop control and current loop control and retreat the screw 3 as shown in FIG. 4A.

The processor 26 reads the information on a screw retreat position Sa fed back from a position/speed detector P2 (step 102) to determine whether or not the screw retreat position reaches a screw position Ss set as a change point (step 103). Unless the screw retreat position reaches the screw position Ss, the processor 26 repeatedly executes processings in steps 100 to 103 every predetermined cycle. As a result, as shown in FIGS. 4A and 4B, the screw 3 rotates at a set rotational speed. Moreover, the screw 3 retreats at an almost constant speed because it is retreated in accordance with a pressure deviation so that a resin pressure becomes a set resin pressure.

When it is determined that a retreat position of the screw reaches the screw position Ss at a set change point, a screw retreat command according to the deviation between a set resin pressure and a detected resin pressure is stopped (back pressure feedback control is stopped) to change the present operation to the position control with a positioning movement command from the present position Sa to a set metering position Sb at a set retreat speed and output a screw rotation command for rotating the screw 3 by a set amount at a set speed Rs' in the direction reverse to the direction until now (steps 104 and 105). Thereby, the screw 3 reaches a metering completion position and is held at the position. Moreover, output of the screw rotation command is completed and thereby, rotation of the screw 3 is stopped to complete the metering operation.

Figure 5:
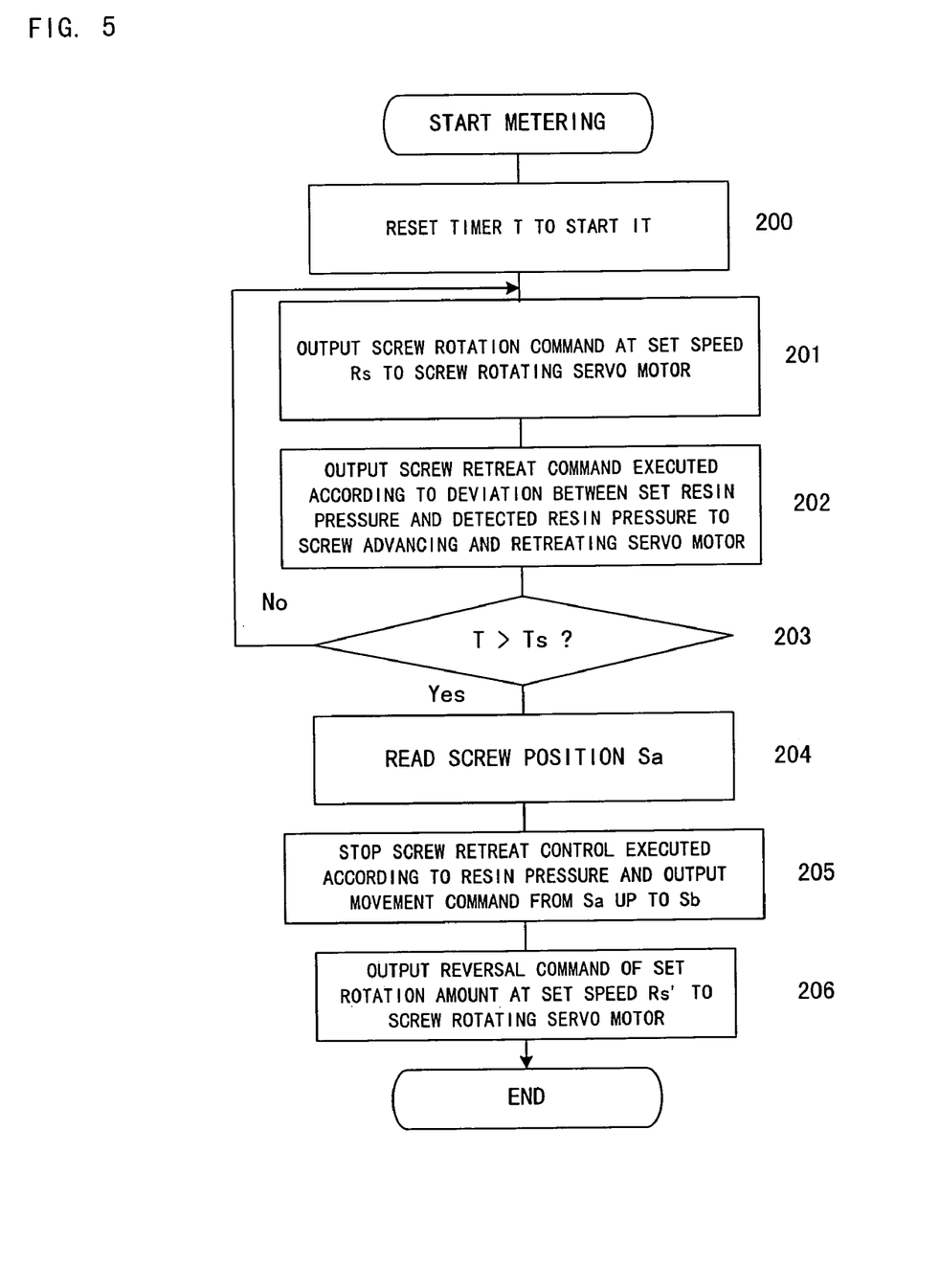
FIG. 5 is a flowchart of operations in a metering step of a second embodiment of the present invention.

In the case of the above first embodiment, a change point for starting reversing of a screw is determined in accordance with the screw position Ss, that is, the screw retreat position. However, it is also allowed to set a point for starting reversing of the screw in accordance with time. FIG. 5 is a flowchart of operations in the metering step of the second embodiment for determining a screw reversal start point in accordance with the time. Moreover, FIGS. 6A and 6B are illustrations for explaining states of a screw retreat speed and a screw rotational speed in the metering step of the second embodiment.

When the metering step is started, the processor 26 first resets a timer and starts the timer (step 200) and in the same manner as the first embodiment, outputs a screw rotational speed command at the set rotational speed Rs to the servo amplifier 23 (step 201). The servo amplifier 23 performs speed loop control in accordance with the rotational speed command and speed in formation fed back from the position/speed detector P1 to rotate the screw 3 at a set speed as shown in FIG. 6B.

Figure 6A:
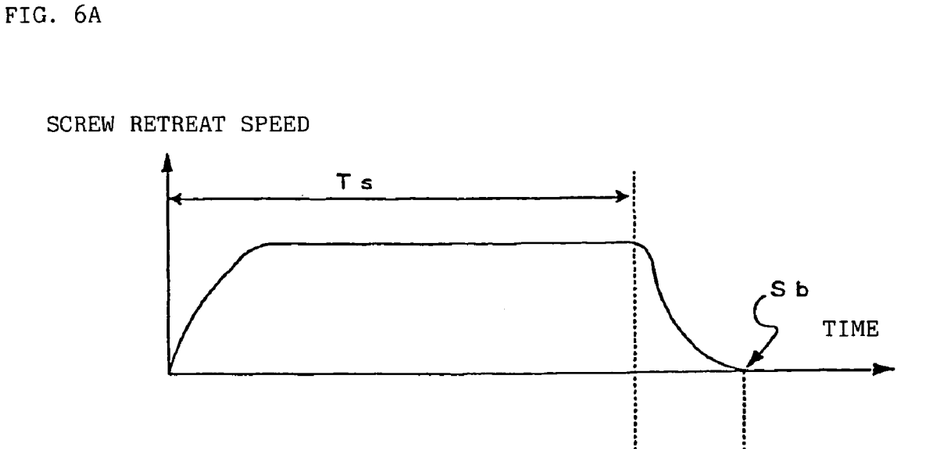
FIGS. 6A and 6B are illustrations for explaining states of a screw retreat speed and a screw rotational speed in the metering step of the second embodiment.
Figure 6B:
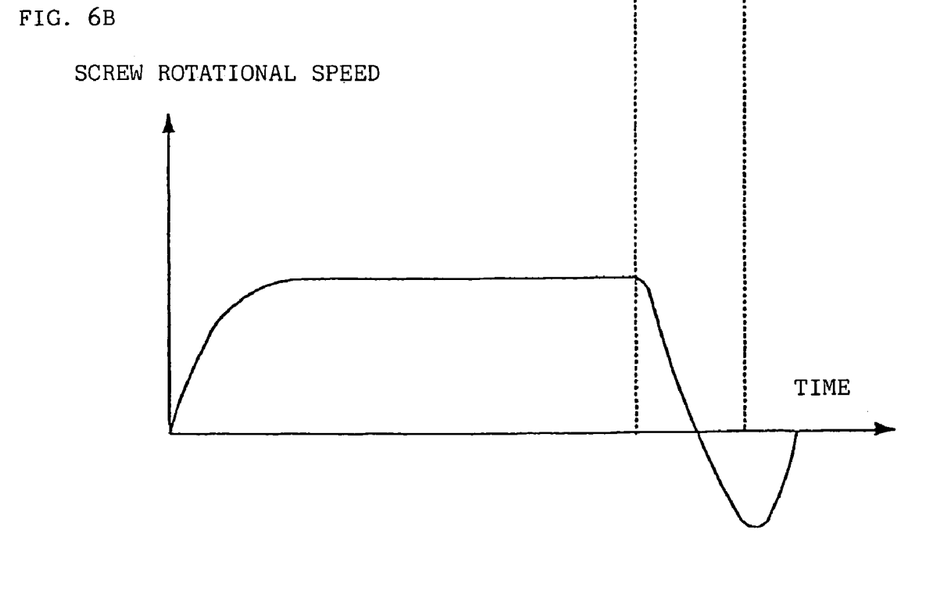

Moreover, the processor 26 reads a resin pressure detected by the pressure sensor (load cell) 9 and outputs a screw retreat command to the servo amplifier 24 in accordance with the deviation between the set resin pressure and the detected resin pressure (step 202) to retreat the screw 3 as shown in FIG. 6A.

Then, the processor 26 determines whether or not the time measured by the timer exceeds a set time Ts set as a change point (step 203). When not exceeding the set time Ts, the processor 26 repeatedly executes the processings in steps 201 to 203. Moreover, when the time measured by the timer exceeds the set time Ts, the processor 26 reads the information on the screw retreat position Sa fed back from the position/speed detector P2 (step 204). Then, the processor 26 stops the screw retreat command in accordance with the deviation between the set resin pressure and the detected resin pressure (stops back pressure feedback control) and outputs a positioning movement command from the present position Sa read at the set retreat speed up to the set metering position Sb to change the present operation to position control. Furthermore, the processor 26 outputs a screw rotation command for rotating the screw 3 by a set value at the set speed Rs' in the direction reverse to the direction until now (steps 205 and 206). Thereby, the screw 3 reaches a metering completion position and is held at the position. Moreover, output of the screw rotation command is completed and thereby, rotation of the screw 3 also stops to complete the metering operation.

Figure 7:
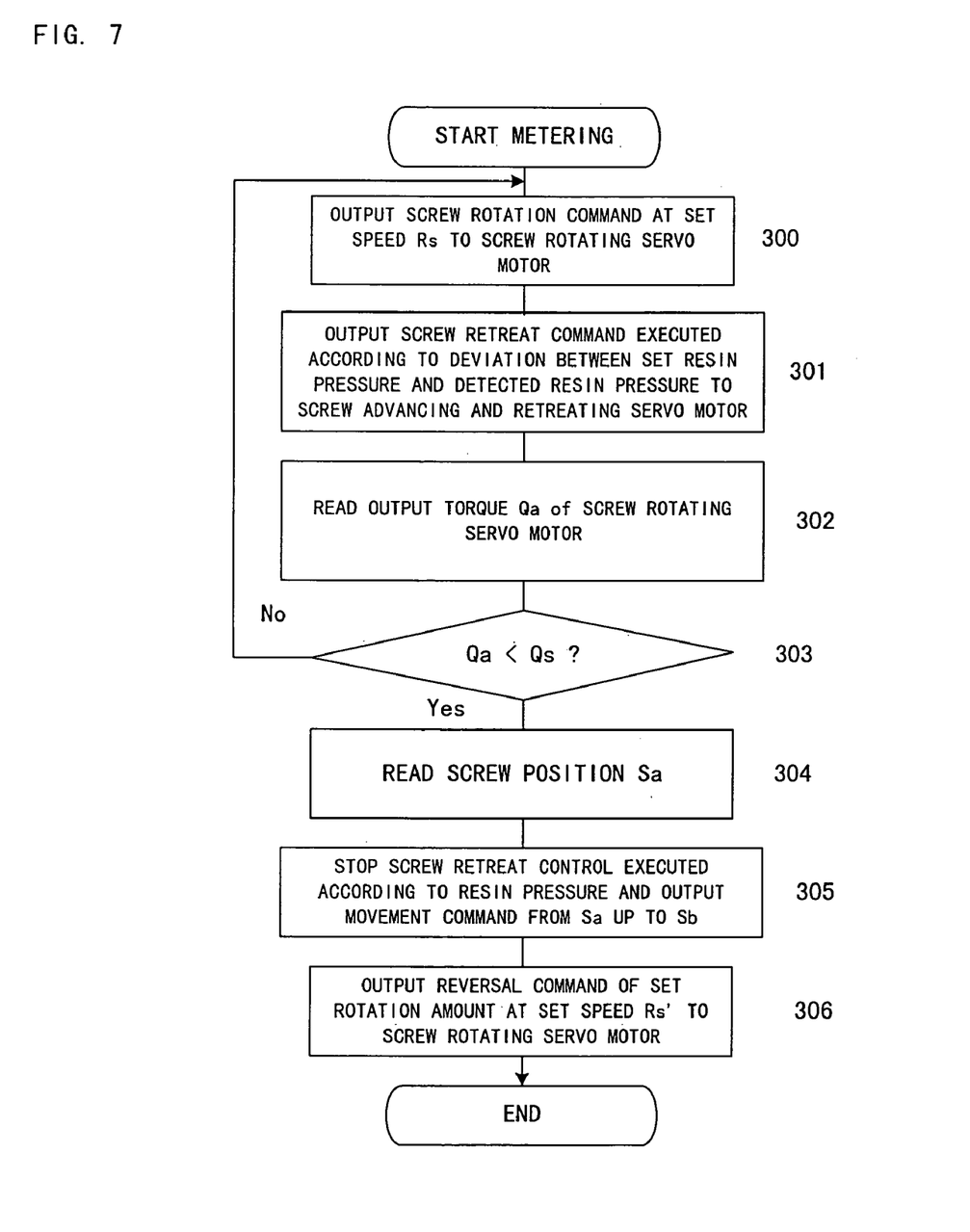
FIG. 7 is a flowchart of operations in a metering step of a third embodiment of the present invention.
Figure 8A:
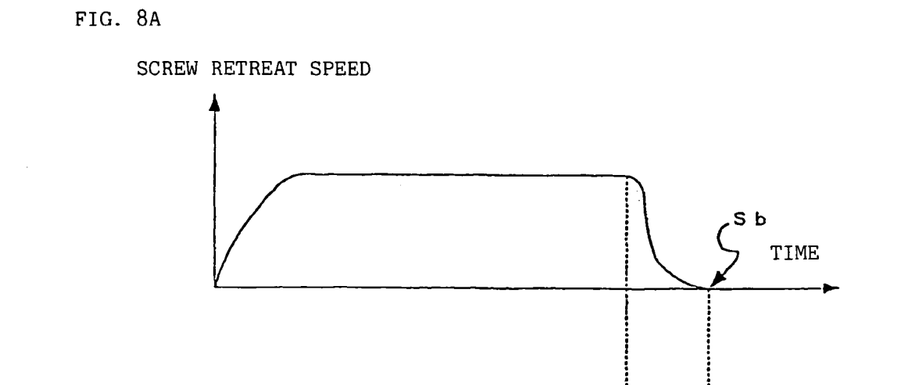
FIGS. 8A to 8C are illustrations for explaining states of a screw retreat speed, screw rotational speed, and output torque of a servo motor for rotating a screw in the metering step of the third embodiment.
Figure 8B:
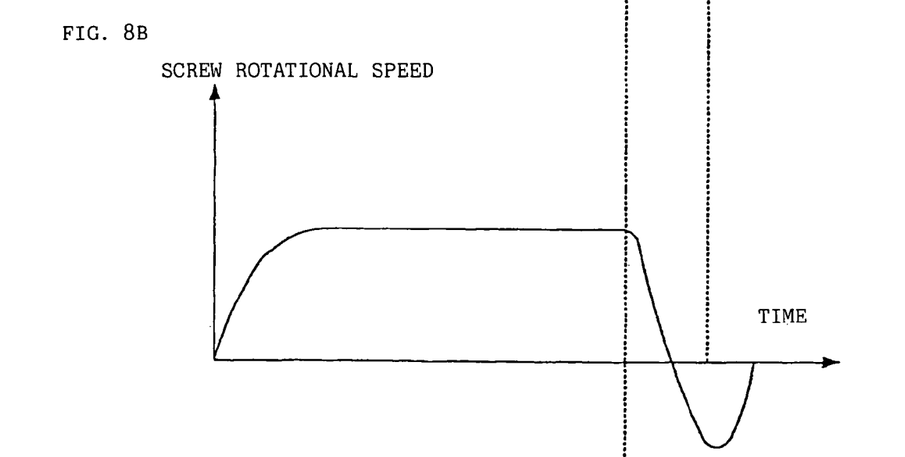
Figure 8C:
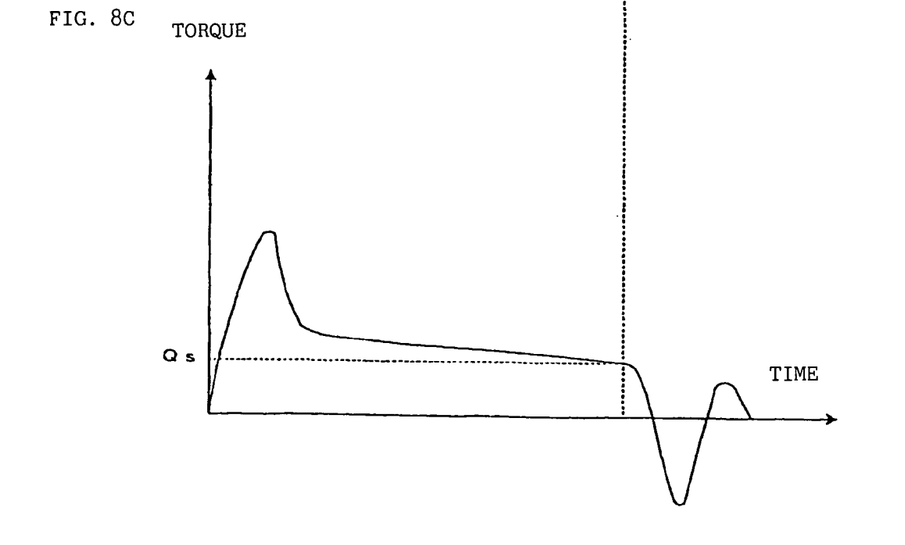

FIG. 7 is a flowchart of operations in the metering step of the third embodiment of the present invention. FIGS. 8A to 8C are illustrations for explaining the screw retreat speed and screw rotational speed in this metering step and the output torque of a screw rotating motor M1.

In the case of the third embodiment, a change point for starting reversing a screw is determined by the timing at which an output torque of the screw rotating servo motor M1 decreases to a set torque Qs, by using a phenomenon that the output torque decreases as metering progresses.

When the metering step is started, the processor 26 performs the same processings as those in steps 100 and 101 to rotate the screw 3 at the set speed Rs, retreats the screw 3 in accordance with a pressure deviation, and performs back pressure feedback control (steps 300 and 301). Then, the processor 26 reads a driving torque Qa, which is the driving current of the screw rotating servo motor M1, supplied from a current detector (not illustrated) fed back to the servo amplifier (step 302) to determine whether the driving torque Qa becomes smaller than the set torque Qs or not. When the driving torque Qa does not become smaller than the set torque Qs, the processor 26 repeatedly executes the processings in steps 300 to 303. As a result, as shown in FIGS. 8A and 8B, the screw 3 rotates at a set rotational speed and retreats in accordance with a pressure deviation so that a resin pressure becomes a set resin pressure. Therefore, the screw 3 retreats at an almost constant speed.

When it is determined that the output torque Qa of the screw rotating servo motor M1 is smaller than the set torque Qs, the processor 26 reads the position (retreat position) Sa of the screw 3 in a manner as described above (step 304) and thereafter, performs the same processings as those in steps 104 and 105 (steps 305 and 306). That is, the processor 26 stops a screw retreat command executed according to the deviation between a set resin pressure and a detected resin pressure, changes the present control to the position control with a positioning movement command from the present position Sa up to the set metering position Sb, rotates the screw 3 by a set value at the set speed Rs' in the direction reverse to the direction under metering, and thereby the screw 3 is reversed by the set value and stops at the set metering completion position.

Figure 9:
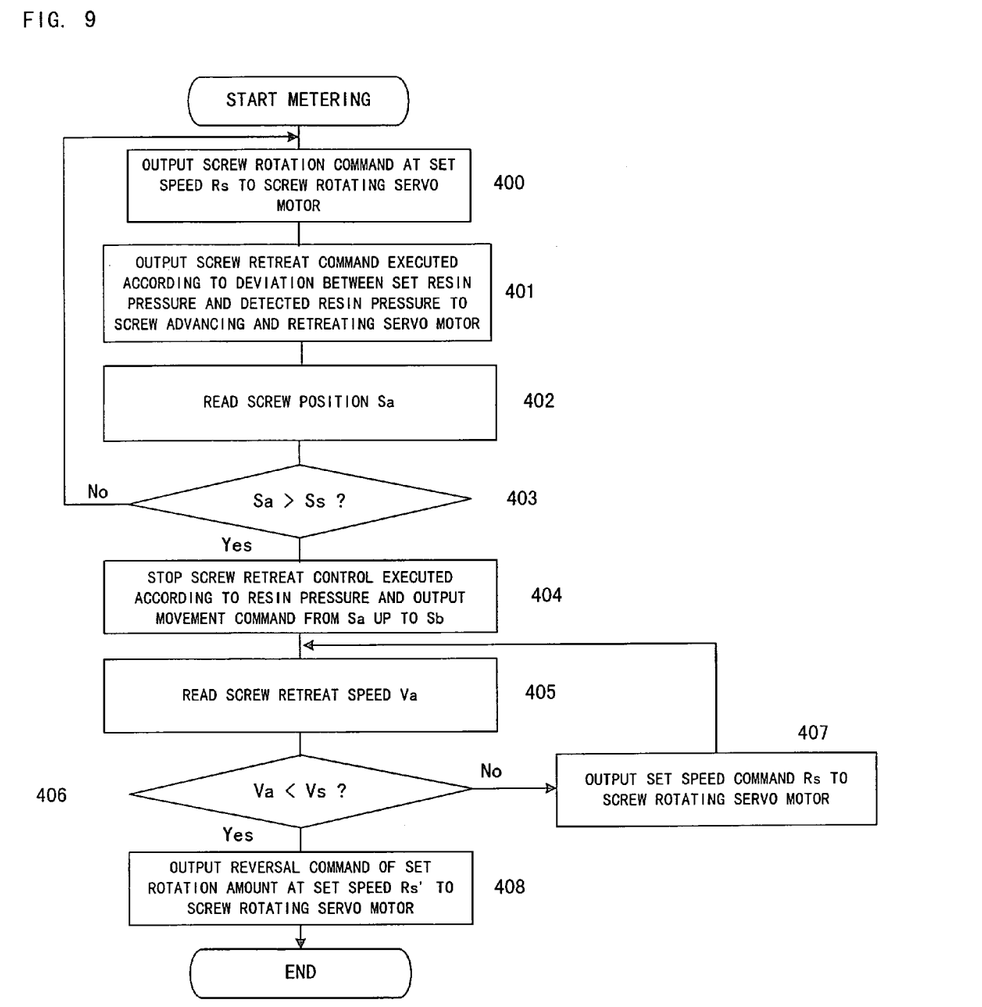
FIG. 9 is a flowchart of operations in a metering step of a fourth embodiment of the present invention.
Figure 10A:
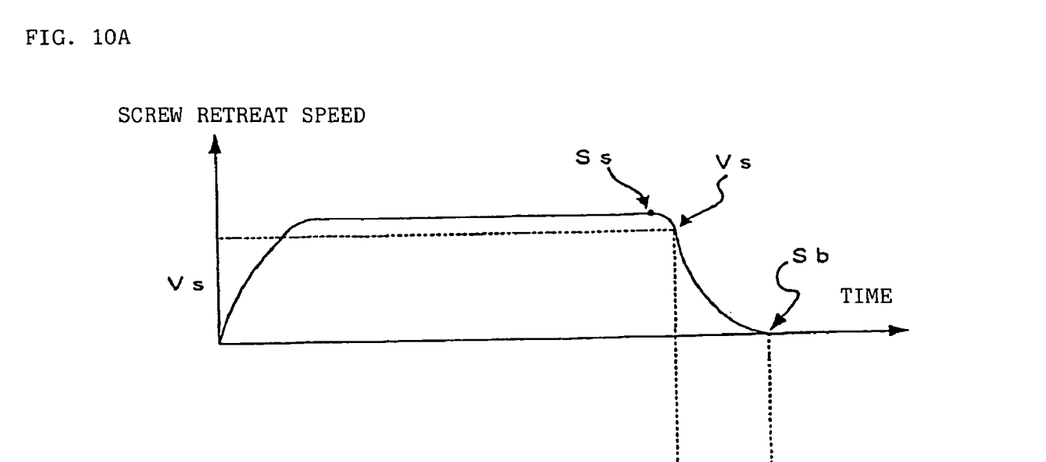
FIGS. 10A and 10B are illustrations for explaining states of a screw retreat speed and screw rotational speed in the metering step of the fourth embodiment.
Figure 10B:
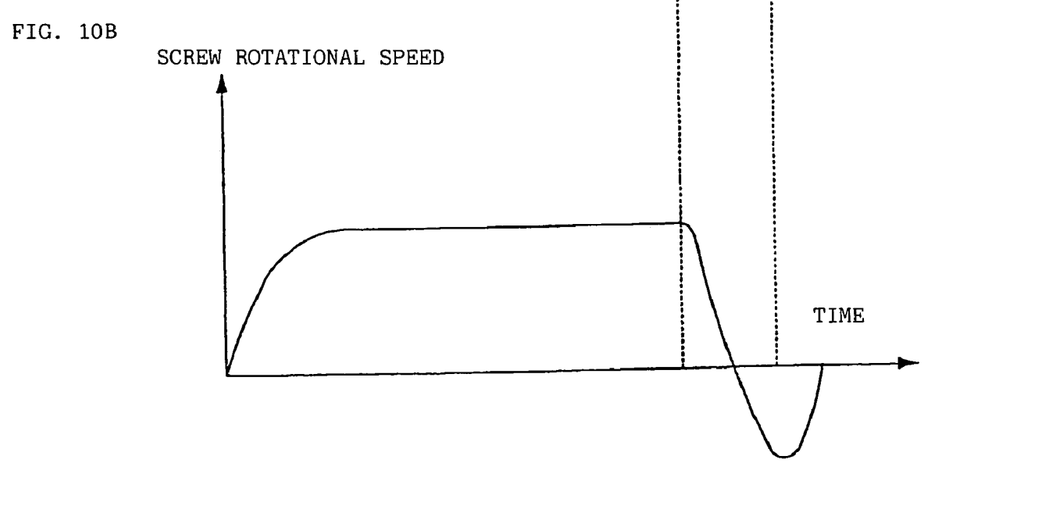

FIG. 9 is a flowchart of operations in the metering step of the fourth embodiment of the present invention. FIGS. 10A and 10B are illustrations for explaining a screw retreat speed and a screw rotational speed in the metering step.

In the case of the fourth embodiment, control of a resin pressure is stopped at the set screw position Ss, positioning control to a metering completion position is started, and thereby a screw speed lowers. Then, when the screw speed becomes lower than the set speed Vs, the screw 3 is reversed.

When a metering step is started, the processor 26 executes the same processing as that in steps 100 to 103 of the first embodiment (steps 400 to 403) and rotates the screw 3 at the set rotational speed Rs, as shown in FIGS. 10A and 10B, and retreats the screw 3 so as to keep a resin pressure at a set resin pressure. Then, when the retreat position Sa of the screw 3 reaches the set position Ss, the processor 26 stops a screw retreat command executed according to the deviation between a set resin pressure and a detected resin pressure (stops back pressure feedback control) and changes the present control to the position control with a positioning movement command from the present position Sa (=Ss) up to the set metering position Sb at a set retreat speed (step 404). Then, the processor 26 reads the screw retreat speed Va fed back from the position/speed detector P2 through the interface 22 (step 405) and determines whether the screw retreat speed Va is lower than the set speed Vs or not (step 406). When the speed Va is not lower than the speed Vs, the processor 26 outputs the set screw rotational speed command Rs to keep the rotation of the screw 3 at the set speed (step 407) and returns to step 405.

Because the movement command issued in step 404 is a positioning command, deceleration is started so as to position the screw at the metering completion composition Sb. As shown in FIG. 10A, when the screw retreat speed Va becomes lower than the set speed Vs, the processor 26 outputs a screw rotation command for rotating the screw by a set value at the set speed Rs' in the direction reverse to the direction until now (step 408) to complete the metering. Thereby, as shown in FIGS. 10A and 10B, the screw stops at the metering completion position and rotates in the direction reverse to the direction under metering by a set value to complete the metering step.

Figure 11:
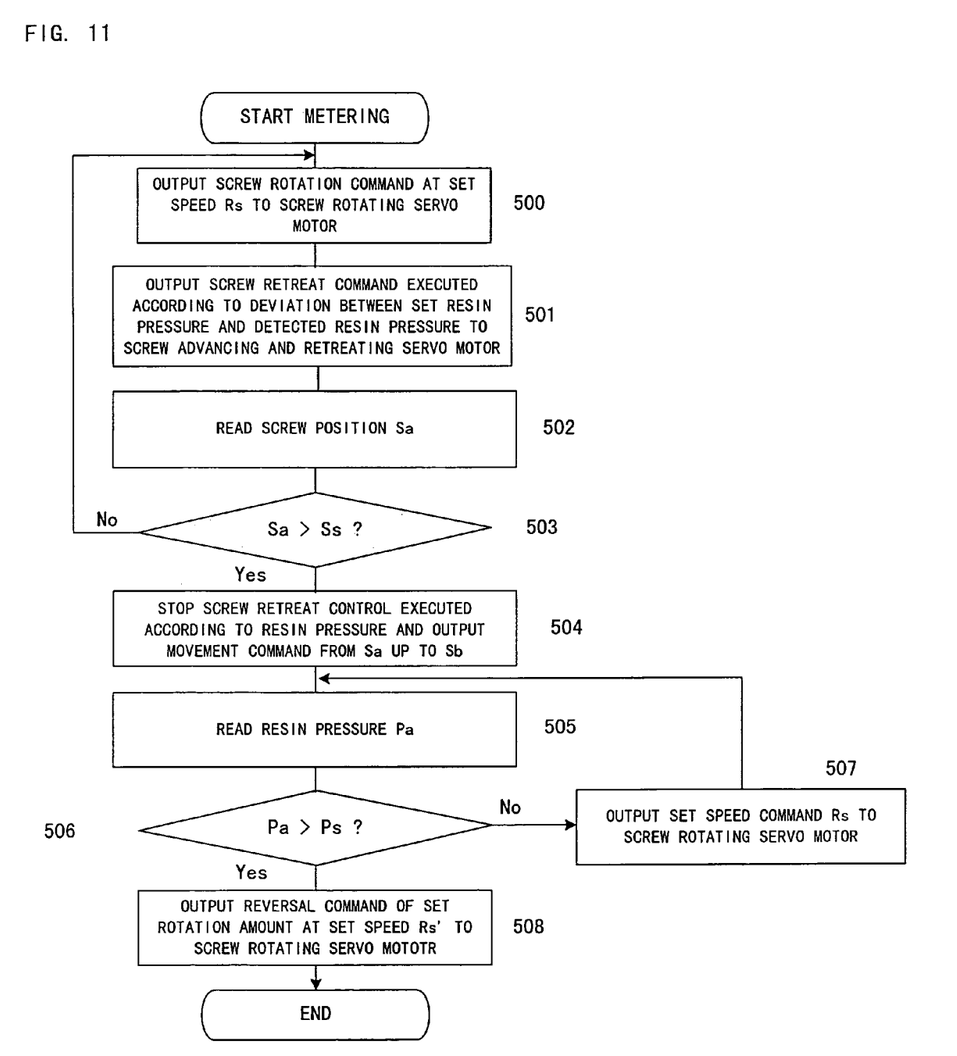
FIG. 11 is a flowchart of operations in a metering step of a fifth embodiment of the present invention.
Figure 12A:
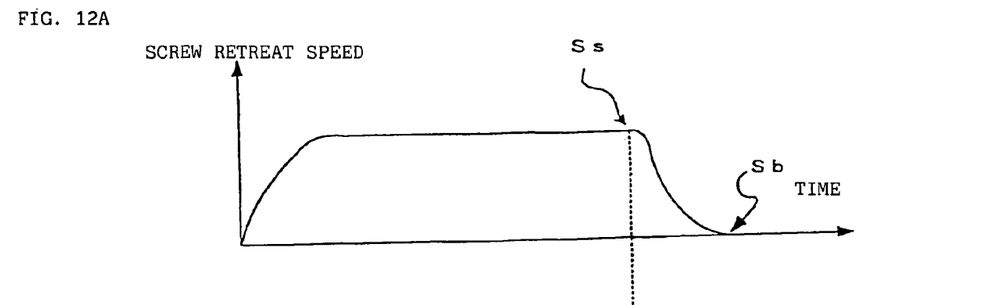
FIGS. 12A to 12C are illustrations for explaining states of a screw retreat speed, screw rotational speed, and resin pressure in the metering step of the fifth embodiment.
Figure 12B:
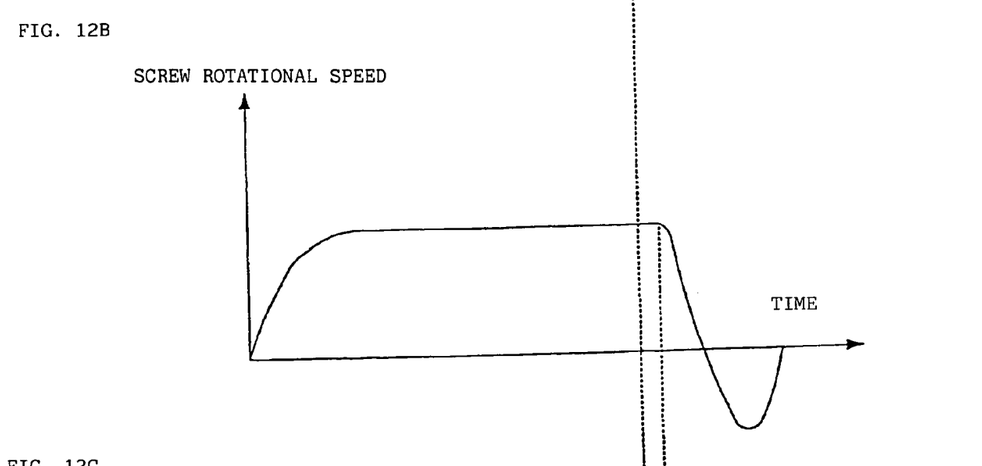
Figure 12C:
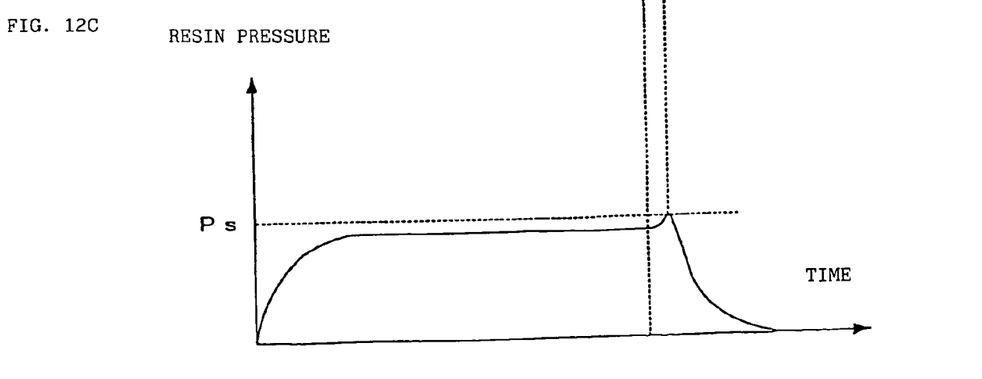

FIG. 11 is a flowchart of operations in the metering step of the fifth embodiment of the present invention. FIGS. 12A to 12C are illustrations for explaining screw retreat speed, screw rotational speed, and resin pressure in the metering step.

In the case of the above fourth embodiment, the screw reversal start point is determined in accordance with screw retreat speed. However, the fifth embodiment is different from the fourth embodiment only in that the screw retreat start point is determined in accordance with a resin pressure.

The processor 26 starts the processings in FIG. 11 when processing enters the metering step. Because processings from step 500 to step 504 are the same as those from step 400 to step 404, their description is omitted.

As the screw retreat control executed according to the deviation of a resin pressure is stopped in step 504, and a movement command up to the changed metering position is a positioning command, deceleration is started so as to position the screw at the metering completion position Sb, as shown in FIG. 12A. When the retreat speed of the screw 3 is decelerated, the resin pressure Pa rises as shown in FIG. 12C because the screw rotational speed is not changed. Therefore, the processor 26 reads the resin pressure Pa from the pressure sensor 9 through the A/D converter 20 (step 505) and determines whether the resin pressure Pa exceeds the set pressure Ps or not (step 506). Unless the pressure Pa exceeds the pressure Ps, the processor 26 outputs the set screw rotational speed Rs (step 507) to keep the screw rotation at the set rotational speed.

Thereafter, the processor 26 repeatedly executes the processings in steps 505, 506, and 507. When the detected resin pressure Pa exceeds the set pressure Ps as shown in FIG. 12C, the processor 26 outputs a set rotation amount at a preset speed Rs' and rotates the screw 3 by the rotation amount to stop the screw 3 as shown in FIG. 12B (step 508). As a result, as shown in FIGS. 12A to 12C, the retreat of the screw 3 stops at the set metering completion position and the rotation of the screw reverses at the set metering completion position and stops.

In the case of each of the above embodiments, the screw 3 is reversed by a set rotation amount at a set speed Rs' in steps 105, 206, 306, 408, and 508. Instead of the above operations, however, it is also allowed to reverse the screw 3 for a set time at a set speed Rs'. Moreover, it is allowed to reverse the screw 3 by a set rotation amount at a set torque. Furthermore, even by reversing the screw 3 by the set rotation amount at the set torque, the same advantage is obtained.

Furthermore, it is allowed to set an interval for reversing the screw 3 at multistage. That is, it is allowed to delimit a section for reversing the screw 3 into a plurality of stages and set a speed and a torque at each stage for performing control. Moreover, it is allowed to delimit the section into a plurality of stages in accordance with a rotation amount and set a speed and a torque at each stage for performing control.

In the case of each of the above embodiments, a movement command is output to the servo amplifier 24 in accordance with the pressure deviation between set resin pressure and detected resin pressure value in the back pressure feedback control and the position and speed loop processing is executed by the servo amplifier 24 to drive a screw advancing and retreating servo motor M2 and retreat the screw 3. However, it is also allowed to output a speed command in accordance with a pressure deviation and perform the speed loop processing by the servo amplifier 24 so as to retreat the screw 3. Moreover, in the back pressure feedback control, a torque command is obtained in accordance with a pressure deviation to output the torque command to the servo amplifier 24. Then, the servo amplifier 24 performs the current loop processing in accordance with the torque command to drive the screw advancing and retreating servo motor M2 and retreat the screw 3.

Moreover, in the case of each of the above embodiments, an example of an in-line injection molding machine is described. However, the present invention can be also applied to a prepra injection molding machine in which melting and kneading of a resin is performed by rotating a screw and injection and resin metering are performed by advancing or retreating the screw. When applying the present invention to the preplasticizing molding machine, retreat of a screw in-each of the above embodiments is replaced with retreat of a plunger and detection of a screw retreat position in each of the above embodiments is replaced with detection of a retreat position of a plunger.

Furthermore, though each of the above embodiments is described in accordance with an example of an electric injection molding machine, the present invention can be also applied to a hydraulic injection molding machine.

In the case of the present invention, reverse of a screw is included as one of operations in the metering step. Therefore, it is possible to stabilize the operation at the final phase of metering, lower the pressure in an injection cylinder, and prevent leakage of melted resin (drooling phenomenon) during the time from completion of metering up to the start of injection. Thereby, it is possible to stably control a resin from the final phase of metering step up to the start of injection. Moreover, it is possible to exclude unnecessary operations from the metering step up to the injection step and shorten the molding cycle time.

The invention claimed is:

1. A controller of an injection molding machine for controlling a back pressure and retreating a screw or a plunger up to a set metering completion position while rotating the screw at a set rotational speed, comprising:
   means for advancing or retreating the screw or plunger;
   means for rotating the screw;
   means for detecting the position of the screw or plunger;
   means for detecting a resin pressure;
   back pressure feedback control means for controlling the means for advancing or retreating the screw or plunger so that a detected resin pressure coincides with a set resin pressure;
   means for stopping the back pressure feedback control by the back pressure feedback control means when the screw or plunger reaches a set change point before the screw or plunger reaches a metering completion position and moving the screw or plunger up to the metering completion position; and
   means for reversing the screw when the screw or plunger reaches the set change point.

2. The controller of an injection molding machine according to claim 1, wherein the set change point is determined by a preset position of a screw or plunger.

3. The controller of an injection molding machine according to claim 1, further comprising time measuring means for measuring the elapsed time since start of metering, wherein the set change point is determined by the timing at which the time measuring means measures a preset time.

4. The controller of an injection molding machine according to claim 1, further comprising means for detecting a screw rotating torque, wherein the set change point is determined by the timing at which it is detected that the present torque reaches a preset screw rotating torque.

5. A controller of an injection molding machine for controlling a back pressure and retreating a screw or a plunger up to a set metering completion position while rotating the screw at a set rotational speed, comprising:
   means for advancing or retreating the screw or plunger;
   means for rotating the screw;
   means for detecting the position of the screw or plunger;
   means for detecting a resin pressure;
   back pressure feedback control means for controlling the means for advancing or retreating the screw or plunger so that a detected resin pressure coincides with a set resin pressure;
   means for stopping the back pressure feedback control by the back pressure feedback control means when the screw or plunger reaches a set change point before the screw or plunger reaches a metering completion position and moving the screw or plunger up to the metering completion position; and
   means for reversing the screw when a preset screw or plunger retreat speed is detected by the means for detecting the retreat speed of the screw or plunger.

6. A controller of an injection molding machine for controlling a back pressure and retreating a screw or a plunger up to a set metering completion position while rotating the screw at a set rotational speed, comprising:
   means for advancing or retreating the screw or plunger;
   means for rotating the screw;
   means for detecting the position of the screw or plunger;
   means for detecting a resin pressure;
   back pressure feedback control means for controlling the means for advancing or retreating the screw or plunger so that a detected resin pressure coincides with a set resin pressure;
   means for stopping the back pressure feedback control by the back pressure feedback control means when the screw or plunger reaches a set change point before the screw or plunger reaches a metering completion position and moving the screw or plunger up to the metering completion position; and
   means for reversing the screw when a resin pressure exceeding a preset resin pressure is detected by resin pressure detecting means.

7. The injection molding machine according to claims 1, 5, or 6, wherein the means for reversing a screw reverses the screw by a set rotation amount at a preset rotational speed.

8. The injection molding machine according to claim 7, wherein the means for reversing a screw reverses the screw at multistage by changing the present rotational speed to each set rotational speed in accordance with the rotation amount of the screw.

9. The injection molding machine according to claim 1, wherein the means for reversing a screw reverses the screw for a set predetermined time at a preset rotational speed.

10. The injection molding machine according to claim 9, wherein the means for reversing a screw reverses the screw at multistage by changing the present rotational speed to each set rotational speed in accordance with the elapsed time since start of metering.

11. The injection molding machine according to claim 1, wherein the means for reversing a screw reverses the screw for a set predetermined time at a preset torque.

12. The injection molding machine according to claim 11, wherein the means for reversing a screw reverses the screw at multistage by changing the present torque to each set torque in accordance with the elapsed time since start of metering.

13. The injection molding machine according to claim 1, wherein the means for reversing a screw reverses the screw by a set rotation amount at a preset torque.

14. The injection molding machine according to claim 13, wherein the means for reversing a screw reverses the screw at multistage by changing the present torque to each set torque in accordance with the rotation amount of the screw.

15. The injection molding machine according to claim 1, wherein the back pressure feedback control means commands a retreat distance of the screw or plunger so that a detected resin pressure coincides with a set resin pressure.

16. The injection molding machine according to claim 1, wherein the back pressure feedback control means commands a retreat speed of the screw or plunger so that a detected resin pressure coincides with a set resin pressure.

17. The injection molding machine according to claim 1, wherein the back pressure feedback control means commands a torque for retreating the screw or plunger so that a detected resin pressure coincides with a set resin pressure.

* * * * *

UNITED STATES PATENT AND TRADEMARK OFFICE
CERTIFICATE OF CORRECTION

| | | |
|---|---|---|
| PATENT NO. | : 7,125,232 B2 | Page 1 of 1 |
| APPLICATION NO. | : 10/697869 | |
| DATED | : October 24, 2006 | |
| INVENTOR(S) | : Hiroshi Watanabe et al. | |

It is certified that error appears in the above-identified patent and that said Letters Patent is hereby corrected as shown below:

On Title Page, Item (56) (Other Publications), Line 3, change "2003," to --2006,--

In the drawings: FIG. 11, Box 508, Line 3, change "MOTOTR" to --MOTOR--

Column 4, Line 64, change "servo-interface" to --servo interface--

Column 9, Line 39, change "in-each" to --in each--

Column 11, Line 1-2, change "claim 1, 5, or 6," to --claim 1,--

Signed and Sealed this

Sixth Day of March, 2007

JON W. DUDAS
*Director of the United States Patent and Trademark Office*